United States Patent [19]
Wilke

[11] 3,994,473
[45] Nov. 30, 1976

[54] MAGNETIC DETENT MECHANISM FOR USE WITH SPOOL VALVES
[75] Inventor: Raud A. Wilke, Brookfield, Wis.
[73] Assignee: Koehring Company, Milwaukee, Wis.
[22] Filed: Jan. 12, 1976
[21] Appl. No.: 648,167

[52] U.S. Cl. .............................. 251/89; 137/625.69; 251/65
[51] Int. Cl.$^2$ ......................................... F15B 13/01
[58] Field of Search ............ 251/89, 65; 137/625.69

[56] References Cited
UNITED STATES PATENTS

| | | | |
|---|---|---|---|
| 2,996,071 | 8/1961 | Takaoka | 251/65 X |
| 3,013,531 | 12/1961 | Mueller et al. | 251/65 X |
| 3,270,763 | 9/1966 | Kiefer | 251/65 X |
| 3,329,347 | 7/1967 | Montgomery | 251/65 X |
| 3,888,278 | 6/1975 | Hanks | 251/65 X |

Primary Examiner—Alan Cohan
Assistant Examiner—Gerald A. Michalsky
Attorney, Agent, or Firm—James E. Nilles

[57] ABSTRACT

The present invention pertains to detent mechanisms for use with valve spools wherein the detent mechanisms are operable to releaseably secure the valve spool in various predetermined axial positions and to apply various biasing forces on the valve spool depending upon its axial position thereby permitting the valve operator to sense or feel the position of the valve spool. The detent mechanism of the invention includes a generally cylindrical housing which supports a pair of spaced magnets and which receives a shaft coaxial with and connected to the valve spool. The shaft is received through bores in the magnets and is slideable with respect to the magnets. The shaft also supports a pair of contact rings which are comprised of magnetically attractable material and which are received in the space between the magnets. Upon axial movement of the valve spool, the contact rings are brought into contact with one of the magnets. Additional force is then required to move the spool thus providing a detent function and permitting the valve operator to sense the position of the valve spool.

16 Claims, 4 Drawing Figures

MAGNETIC DETENT MECHANISM FOR USE WITH SPOOL VALVES

BACKGROUND OF THE INVENTION

The present invention pertains to detent mechanisms for use with fluid control valves and for releaseably restricting a valve spool of such a control valve against axial movement.

The purpose of such detent mechanisms is to provide means to releaseably secure the valve spool of a control valve in various axial operating positions and to restrict the valve spool against movement except when a force is applied to the valve spool by an operator to overcome the detent force. The valve spools referred to are of the type whic are axially movable within a control valve thereby varying fluid flow through the control valve by regulating the communication of various fluid ports within the control valve. A typical control valve and valve spool assembly may be operative to regulate fluid flow when the valve spool is in one of four different axial positions. The detent mechanism is intended to maintain the position of the valve spool when the operator has placed the spool in the desired position and to permit the operator to sense or feel a change in the axial position of the valve spool to permit him to control the operation of the valve without visual contact. That is, it is desirable that he be able to feel different forces on the control lever depending upon the position of the valve spool.

Some of the prior art detent mechanisms used in controlling the position of the valve spool comprise a somewhat complicated mechanical assembly including, for example, spring biased balls receivable in spaced indentations. Such prior art mechanisms have the advantage that they provide a means for permitting the operator to feel the position of the valve spool at its various operating positions. However, such devices are unduly complicated and expensive to manufacture and are generally subjected to rapid wear. Wear of these detent mechanisms generally causes the valve spool to misalign with the various valve ports and detracts from the operator's control of the valve. Furthermore, repair of such detent mechanisms results in complicated disassembly and reassembly procedures and special tooling. An additional drawback of such prior art detent mechanisms is that they prevent free and smooth axial movement of the valve spool between the detent positions and thus limit the throttling possible with the valve.

SUMMARY OF THE INVENTION

The present invention provides an improved detent mechanism for use with a spool valve which is operable to provide a simplified means to permit the operator to easily feel or sense the position of the valve spool without visual checking and to releasably secure a valve spool in a desired axial position. The detent mechanism of the present invention also facilitates relatively free movement of the valve spool when it is positioned intermediate the detent positions and has the advantages that it is both reliable and long wearing.

Generally, the detent mechanism of the invention comprises a valve spool extension shaft which is connected to and extends coaxially from one end of the valve spool. The valve spool extension shaft supports a pair of contact rings which are received between a pair of spaced electromagnets. One of the rings is secured to the extension shaft and the other is slideable thereon but restricted in the extent of its axial movement by the first contact ring and by a shoulder portion of the shaft. When the valve spool is in the neutral position, the position of the spool is controlled by a biasing spring and the contact rings are positioned such that they do not restrict axial movement of the spool or extension shaft. When the valve spool is shifted axially from the neutral position to a position where the contact ring, which is secured to the extension shaft, is positioned adjacent to one of the magnets, the magnet will act upon the contact ring to prevent movement of the valve spool unless an overbearing force is applied. The detent mechanism also provides an intermediate detent position wherein the slideable contact ring is received against one of the magnets and the shoulder of the extension shaft abuts the slideable contact ring. The extension shaft is thus prevented from further movement away from this magnet unless sufficient force is applied thereto to pull the contact ring away from the magnet. The detent mechanism thus includes a means for releaseably securing the spool valve in two opposed operating positions and permits the operator to feel resistance to further movement of the spool at the various detent positions.

The magnetic detent mechanism of the present invention thus provides a reliable yet responsive valve spool control means which is uncomplicated in structure. The magnetic detent mechanism of the invention has the advantages of the ball and spring devices in that it permits the operator to readily sense the desired operating position. However, unlike the prior art ball and spring detent mechanisms, the magnetic detent mechanism of the present invention does not include parts subjected to substantial wear. Furthermore, since the forces applied by the magnets will not change even after extended time and substantial wear, wear of the parts will not cause variances in the operating characteristics of the detent mechanism or of the valve. The magnetic detent mechanism has the further advantage that magnets such as those used in the present invention, have the property that they exert little force on the respective contact rings unless the ring is within one-thirty-second of an inch and the position of the valve spool between the detent positions can be very accurately controlled and does not limit the capability of throttling of the valve.

The magnetic detent mechanism has a further advantage that by varying the magnetic properties or force values inherent in the magnets, it is possible to permit the operator to feel distinct changes in each desired operating position of the valve spool, thereby eliminating the need for the operator to visually check the position of the valve spool control lever.

Furthermore, by using electromagnets, switching can be incorporated into the valve system such that the detent mechanism can be switched off and the valve spool biased to the neutral position.

DESCRIPTION OF THE PREFERRED EMBODIMENT

Figure 1:
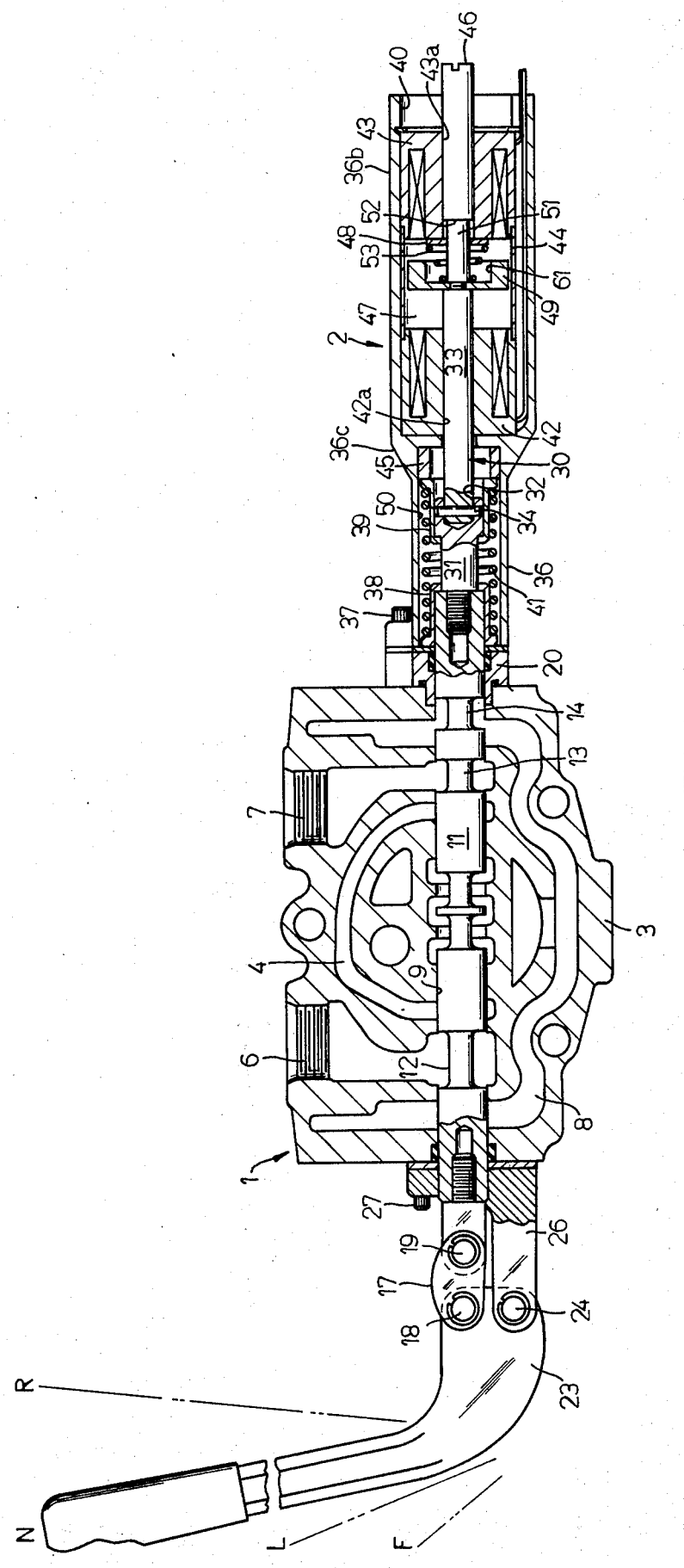
FIG. 1 is a cross-sectional view of the magnetic detent mechanism of the present invention connected to a fluid valve and showing a valve spool in neutral position.

FIG. 1 is a cross-sectional view generally illustrating a spool valve 1 having the magnetic detent mechanism 2 of the present invention attached thereto. The spool valve 1 generally comprises a one-piece valve body 3 which includes an inlet port 4, a pair of cylinder ports 6 and 7 and an exhaust port 8. The various ports 4, 6, 7 and 8 are selectively connected by an axially extending bore 9 which houses an axially slideable valve spool 11. The valve spool 11 is axially slideable within the bore 9 to variably restrict fluid flow between the various ports in a conventional manner. The cylinder ports 6 and 7 are connected to a conventional fluid cylinder such as that used to operate the bucket of a front end loader (not shown). The cylinder port 6 can be connected to one end of the fluid cylinder such that when the spool 11 has moved to a position to the right of that shown in FIG. 1, a recess 12 in the spool 11 would permit fluid flow from the inlet port 4 into the cylinder port 6 to cause raising of the bucket of the end loader. At the same time, fluid would be exhausted through cylinder port 7 which would be in communication with exhaust port 8 by means of a recess 13. The position of the valve spool 11 which is shown in FIG. 1, comprises a neutral position where fluid flow between any of the various ports is prevented and the position of the bucket would be fixed. If the valve spool 11 is moved to the left from the position shown in FIG. 1, the inlet port 4 will be placed in communication with the cylinder port 7 by means of recess 13 and the cylinder port 6 will be placed in communication with the exhaust port 8 by means of recess 12 to permit lowering of the bucket of the end loader. Further movement of the valve spool 11 to the left will place both cylinder ports 6 and 7 in communication with the exhaust port 8 by means of recesses 12 and 14, respectively, such that the bucket of the end loader is permitted to "float" i.e., move vertically in response to external vertical forces.

The left end of the valve spool 11, shown in FIG. 1, is connected by means of a link 17 and pivot pins 18 and 19 to a control lever 23. The lower end of the control lever 23 is pivotally connected by a pivot pin 24 to a support bracket 26 rigidly secured to the valve body 3 by means of screws 27. The control lever 23 is pivotal around the pin 24 such that, as the lever is moved from a neutral position designated as "N" in FIG. 1 to the positions shown by the dashed lines indicted as "R" (raise), "L" (lower), or "F" (float), the link 17 will cause axial movement of the spool 11 in the valve to the appropriate positions referred to above.

Generally, the magnetic detent mechanism 2 is included to provide means to permit the operator to feel resistance when the spool has been moved to its various detent positions and to releaseably secure the spool 11 in each of its axial positions R, N or F. The structure of the magnetic detent mechanism 2 includes a spool extension shaft 30 which is coaxial with the spool 11 and threadably secured to its right end as seen in FIG. 1. The spool extension shaft 30 includes a short shaft 31 threadably secured to the spool 11 and having a bore 32 in its outwardly extending end which receives a second shaft 33. A pin 34 extends through both the end of the shaft 31 and the end of the shaft 33 to secure the shaft 33 within the bore 32 and prevent relative axial movement thereof. The magnetic detent mechanism 2 also includes a housing 36 defined by a pair of cylindrical tubular sections 36a and 36b joined at a shoulder 36c and coaxial with the spool extension shaft 30. The housing 36 is bolted to the spool valve by means of bolts 37.

The spool extension shaft 30 and the adjacent end of the spool 11 support a pair of opposed cup shaped slideable sleeves 38 and 39. The sleeves each include radially outwardly extending peripheral flanges 38a and 39a, respectively, and are biased away from each other by a coil spring 41. The flange 38a of sleeve 38 is received against an oil seal housing 20, and the sleeve 39a is received against a collar 45 which is in turn rigidly secured in a cylindrical chamber 50 defined in the housing section 36a. The sleeves 38 and 39, also include inwardly extending peripheral flanges 38b and 39b, respectively, which are received in slideable engagement against the circumferential surface of the shaft 31 and abut against the shoulders 11a and 31a.

The housing section 36b defines a cylindrical chamber 40 therein which receives a pair of generally cylindrical electromagnets 42 and 43. The magnets are received in opposed ends of the cylindrical chamber 40 defined in section 36b of the housing and are maintained in separation by a cylindrical sleeve 44 positioned between them. Each of the magnets 42 and 43 includes a central axially extending bore 42a and 43a, respectively, for slideably receiving the shaft 33 and a shaft extension 46 which is coaxial with and threadably secured to the end of the shaft 33. A generally cylindrical space 47 is defined between the magnets 42 and 43. A pair of contact rings or armatures 48 and 49 are disposed within this space and are operably supported by the shaft 33 and shaft extension 46. The contact ring 49 is rigidly engaged in clamped relationship between the shaft 33 and the shaft extension 46 such that it will move axially within the chamber 47 in response to axial movement of the shaft 33 and shaft extension 46. The shaft 46 includes an end portion 51 which is of smaller diameter than the remainder of the shaft and a shoulder 52 defined between the shaft 33 and the end portion 51. The contact ring 48 includes a central bore therethrough which is of substantially the same diameter as the end portion 51 of the shaft 33 such that the contact ring 48 is slideable thereon and receivable in abutting relationship against the shoulder 52. The contact ring 48 is thus supported on the shaft 30 for limited axial slideable movement between the contact ring 49 and the shoulder 52. A spring 53 is disposed between the contact rings 48 and 49 to bias the respective rings apart so that they normally maintain a spaced relationship with respect to each other. The spring 53 is a relatively light spring and applies only a slight separating force on the rings.

As previously stated, FIG. 1 illustrates the valve spool and the detent mechanism positioned in a neutral position. As shown therein, the contact ring 49 is positioned intermediate the magnets 42 and 43 and the contact ring 48 is received against the magnet 43. It is desirable that the attractive force between the magnet 43 and the ring 48 be on the order of 20 pounds. The contact ring 48 does not function, however, to restrict axial reciprocation of the valve spool 11 or of the extension shaft 30 since the contact ring is slideable on the end portion 51 of the shaft 46. The magnets 42 and 43 do not apply an appreciable force on the contact rings until the rings are disposed in very close proximity to the magnets. Therefore, the ring 49 is relatively uneffected by magnetic force when in the neutral position. The valve spool 11 is biased to the neutral position by the spring biasing means 41 in that movement of the spool 11 in either axial direction relative to that shown in FIG. 1 will cause the spring to place an opposed resisting force on the peripheral collars 38 and 39 which in turn will apply force on the extension shaft 30. As a correlary, the operator will sense the neutral position since motion in either direction away from the neutral position will result in axial force being applied to the valve spool 11 by the spring 41.

Figure 3:
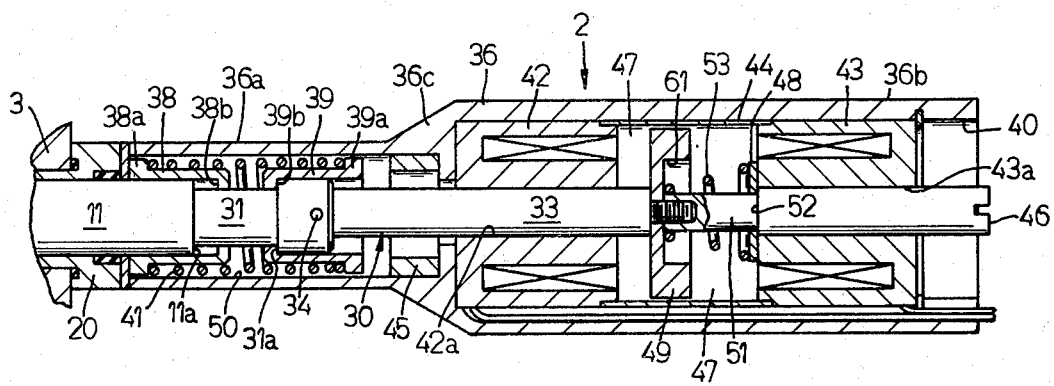

When the control handle 23 is moved to the left as shown in FIG. 1, to the position shown by the dashed line indicated as L, the valve spool 11 will be moved to the left and the detent mechanism of the present invention will assume the position shown in FIG. 3. The spring 41 is shown therein as being compressed and exerting an axial force on the extension shaft 30 to the right. It will be noted that as the extension shaft moves to the left, the magnetic attraction between the contact ring 48 and the magnet 43 will maintain the contact ring in position. As shown in FIG. 3, when the valve spool 11 is in the desired L position the shoulder 52 will abut against the contact ring 48. Additional force of approximately 20 pounds, to overcome the magnetic attraction between the contact ring 48 and the magnet 43, must then be applied to cause additional movement of the extension shaft 30 to the left. Therefore, when the shoulder 52 abuts the ring 48, the valve operator will be permitted to sense that the valve spool is properly positioned in the lower position L.

Figure 2:
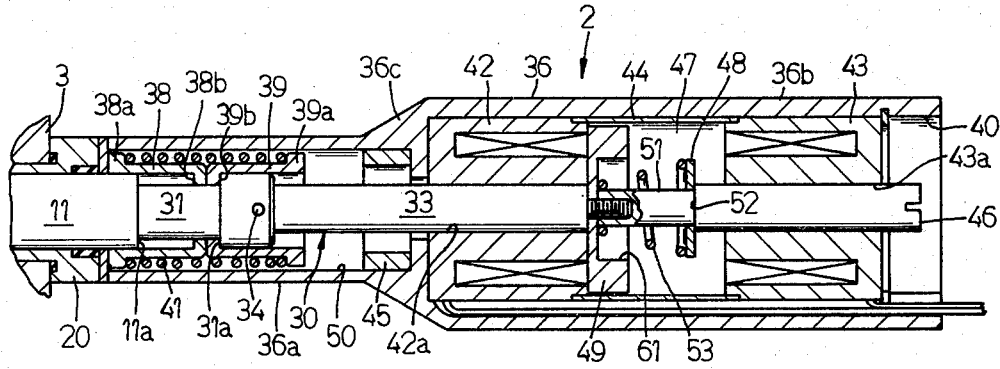
FIGS. 2–4 are each enlarged views of the detent mechanism shown in FIG. 1 but showing the valve spool held in alternative detent positions.

FIG. 2 illustrates the relative position of the spool extension shaft 30 and the contact rings 48 and 49 when the valve control lever 23 is in the F position and the valve spool 11 has been moved to its furthest leftward position. In this position, the contact ring 49 is received in abutment against the magnet 42. The force applied by the magnet 42 on the contact ring 49 is on the order of 100 pounds and is more than sufficient to overcome the opposite force applied on the extension shaft 30 by the compressed spring 41 acting upon the collar 39. The spool valve 11 will thus be maintained in this detent position until additional force on the control lever 23 is applied, moving the valve spool 11 to the right.

Figure 4:
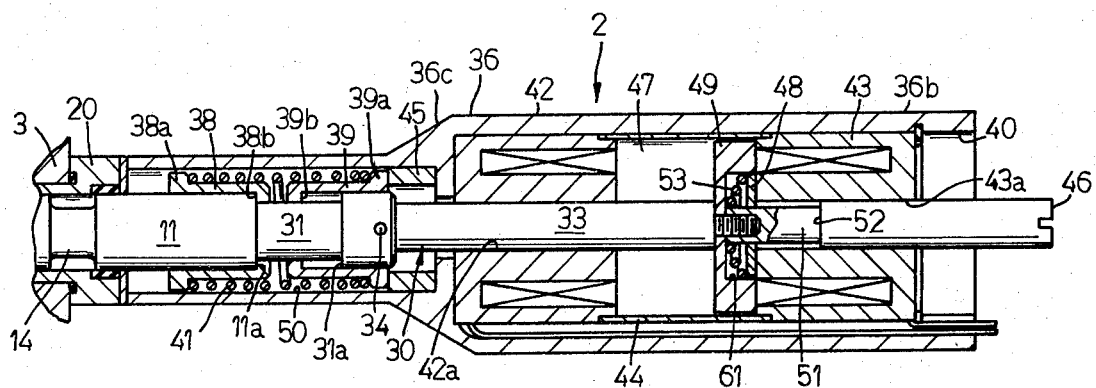

FIG. 4. illustrates a final detent position wherein the valve spool can be maintained in its raise or R position. In this position, the contact ring 49 is received in abutment against the magnet 43 with sufficient magnetic force being applied, e.g. 100 pounds, to overcome the biasing force of the spring 41. The contact ring 49 is thus releaseably restricted against the magnet 43 until a sufficient counteracting force is applied to the valve spool. In order to permit the contact ring 48 to abut the magnet 43, the contact ring 48 and spring 53 are slideably received within a bore 61 in the contact ring 49. It should be noted that the magnets 42 and 43 apply magnetic forces only if the contact rings are in very close proximity, on the order of one-thirty-second of an inch. The contact rings are otherwise relatively freely movable within the chamber 47 thereby permitting variable positioning.

Though the magnets 42 and 43 can be comprised of any suitable magnetic means, it is desirable that they comprise electromagnets such that their magnetic attraction can be controlled. For example, by connecting magnet 43 to a limit switch, the magnetic attraction of the magnet 43 upon the contact ring 49 can be controlled. The limit switch referred to, could be attached to the bucket of the end loader and be activated when the bucket has been raised to a predetermined height. Activation of the switch could cut the power to the electromagnet 43 thereby releasing the contact ring 49 and permitting the spring 41 to move the spool 11 into the neutral position such that the bucket is maintained in the desired vertical position.

RESUME

The magnetic detent mechanism of the present invention thus provides a means for releaseably securing a valve spool in a plurality of various axial positions and also provides means which will permit the operator to readily sense the desired position of the valve. The detent mechanism is not subjected to substantial wear as are typical prior art mechanisms and consequently extended and continual use thereof will have little appreciable effect upon the functioning of the valve. The detent mechanism of the invention also facilitates smooth slideable movement of the valve between the various detent positions and thus accommodates throttling movement of the valve. A further advantage of the detent mechanism is that it facilitates the use of electric limit switches as an additional valve operating mode.

I claim:

1. A magnetic detent mechanism for use with a fluid valve having a valve body and having an axially movable valve spool within said valve body for controlling fluid flow through said valve, said detent mechanism being supportable adjacent to said fluid valve and comprising: at least one magnet; a first contact member comprised of magnetically attractable material and being connected to said valve spool for axial movement therewith toward and away from said magnet and being magnetically engageable with said magnet whereby said spool is releaseably restricted from axial movement; and a second contact member comprised of magnetically attractable material and being connected to said valve spool adjacent to said first contact member and supported for limited slideable axial movement relative to said valve spool, said second contact member being movable toward and away from said magnet and being magnetically engageable with said magnet whereby said spool is releaseably restricted against axial movement beyond said limited movement.

2. The magnetic detent mechanism set forth in claim 1 including an extension shaft coaxial with said valve spool and extending from an end of said valve spool for axial movement with said valve spool, said extension shaft supporting said contact members, and further including spring means engageable with said extension shaft and biasing said extension shaft toward a position wherein said first contact member is spaced from said magnet.

3. The magnetic detent mechanism set forth in claim 1 further including an extension shaft secured to and coaxial with said valve spool, said first contact member being secured to said extension shaft for movement therewith and said second contact member being slidably supported on said extension shaft.

4. The magnetic detent mechanism set forth in claim 3 wherein said extension shaft includes a stop means and wherein said second contact member is slidably supported on said shaft for movement between said stop means and said first contact member.

5. The magnetic detent mechanism set forth in claim 1 further including a pair of electromagnets disposed in spaced relationship and receiving said contact members therebetween.

6. A magnetic detent mechanism for use with a fluid valve having a valve body and having an axially movable valve spool within said valve body, said valve spool being movable between a plurality of positions for variably controlling fluid flow through said valve, said positions including an extreme position in one direction, an extreme position in an opposite direction and an intermediate position, said detent mechanism being supportable adjacent to said valve and comprising: a shaft extending coaxially from one end of said valve spool and connected thereto; a pair of magnets positioned in axially spaced relationship along said shaft; a pair of contact members comprised of magnetically attractable material and supported by said shaft for movement therewith and positioned between said magnets, one of said contact members being fixed on said shaft and movable therewith between one of said extreme positions wherein said contact member is magnetically attracted to one of said magnets and the other of said extreme positions wherein said contact member is magnetically attracted to the other of said magnets, said spool being releaseably restricted by said magnets from axial movement at each of said extreme positions, said other contact member being slideably mounted on said shaft for limited movement thereon toward and away from said first contact member.

7. The magnetic detent mechanism set forth in claim 6 wherein said other contact member is positionable against at least one of said magnets whereby said shaft is releaseably restricted against movement beyond said limited movement.

8. The magnetic detent mechanism set forth in claim 6 further including spring means disposed between said contact members for biasing said members into spaced relationship.

9. The magnetic detent mechanism set forth in claim 6 wherein said one contact member includes a bore therein for receiving said second contact member.

10. The magnetic detent mechanism set forth in claim 6 further including spring biasing means operably connected between said valve and said shaft for releaseably positioning said one contact member in spaced relationship with respect to each of said magnets.

11. A magnetic detent mechanism for use with a fluid valve having a valve body and having an axially movable valve spool within said valve body, said valve spool being movable axially between a plurality of positions for variably controlling fluid flow through said valve, said detent mechanism being supportable adjacent to said valve and comprising: a pair of magnets positioned in spaced apart relationship; a first contact member comprised of magnetically attractable material and connected to said valve spool for axial movement therewith, said first contact member being movable between said magnets and said first contact member being magnetically engageable with at least one of said magnets whereby said spool is releaseably restricted from axial movement; and a second contact member comprised of magnetically attractable material and connected to said valve spool for axial movement with said valve spool and limited slideable axial movement relative to said valve spool, said second contact member being movable with respect to said magnets and being magnetically engageable with at least one of said magnets whereby said spool is releaseably restricted from axial movement in a direction toward the other magnet.

12. The magnetic detent mechanism set forth in claim 11 further including spring means operably connected between said valve and said spool for positioning said first contact member in spaced relationship with respect to each of said magnets.

13. The magnetic detent mechanism set forth in claim 11 further including an extension shaft extending from one end of said spool and being coaxial therewith, said shaft including a shoulder and supporting said contact members, said second contact member being slideable on said shaft between said first contact member and said shoulder.

14. The magnetic detent mechanism set forth in claim 11 further including a shaft extending from one end of said spool and coaxial therewith and wherein said magnets include bores for slideably receiving said shaft.

15. A magnetic detent mechanism for use with a fluid valve having an axially movable valve spool, said valve spool being movable between a plurality of positions for variably controlling fluid flow through said valve, said positions including an extreme position in one direction, an extreme position in an opposite direction and an intermediate position, said detent mechanism being supportable adjacent to said valve and comprising: a shaft connectable to one end of said valve spool to extend coaxially from the valve spool, said shaft including a stop means; a pair of magnets positioned in axially spaced relationship along said shaft; a pair of contact members comprised of magnetically attractable material and supported by said shaft for movement therewith and positioned between said magnets, one of said contact members being fixed to said shaft and movable therewith between one of said extreme positions wherein said contact member is magnetically attracted to one of said magnets and the other of said extreme positions wherein said contact member is magnetically attracted to the other of said magnets, said spool being releaseably restricted by said magnets from axial movement at each of said extreme positions, the other of said contact members being slideably mounted on said shaft adjacent to said one of said contact members for limited movement between said one of said contact members and abutment with said stop means, and said other of said contact members being positionable against one of said magnets whereby said other of said contact members is magnetically attracted to said one of said magnets and whereby said shaft is releaseably restricted against movement greater than said limited movement.

16. The magnetic detent mechanism set forth in claim 15 further including spring means engageable with said shaft and biasing said shaft toward said intermediate position wherein said one of said contact members is positioned in spaced relationship with respect to both of said magnets.

* * * * *